United States Patent
Sjölander et al.

(10) Patent No.: US 12,524,213 B2
(45) Date of Patent: Jan. 13, 2026

(54) CODE BLOCK ELEMENT FOR INTEGRATED GRAPHIC DESIGN SYSTEM

(71) Applicant: Figma, Inc., San Francisco, CA (US)

(72) Inventors: Emil Sjölander, San Francisco, CA (US); Delong Fu, San Francisco, CA (US); Michael Feldstein, San Francisco, CA (US); Sawyer Hood, San Francisco, CA (US); Naomi Jung, San Francisco, CA (US)

(73) Assignee: Figma, Inc., San Francisco, CA (US)

( * ) Notice: Subject to any disclaimer, the term of this patent is extended or adjusted under 35 U.S.C. 154(b) by 0 days.

(21) Appl. No.: 17/969,647

(22) Filed: Oct. 19, 2022

(65) Prior Publication Data

US 2023/0119466 A1  Apr. 20, 2023

Related U.S. Application Data

(60) Provisional application No. 63/257,476, filed on Oct. 19, 2021.

(51) Int. Cl.
G06F 8/41 (2018.01)
G06T 11/60 (2006.01)

(52) U.S. Cl.
CPC .............. *G06F 8/42* (2013.01); *G06T 11/60* (2013.01)

(58) Field of Classification Search
CPC ..... G06F 8/33; G06F 8/34; G06F 8/42; G06F 8/436
See application file for complete search history.

(56) References Cited

U.S. PATENT DOCUMENTS

| 5,339,389 | A | 8/1994 | Bates |
| 6,088,709 | A | 7/2000 | Watanabe |
| 7,486,294 | B2 * | 2/2009 | Beda ................ G06T 11/20 345/581 |
| 7,770,122 | B1 | 8/2010 | Shaik |
| 8,533,580 | B1 | 9/2013 | Xu |
| 9,424,545 | B1 | 8/2016 | Lee |
| 9,430,229 | B1 | 8/2016 | Zijst |
| 9,477,649 | B1 | 10/2016 | Davidson |
| 9,594,608 | B2 * | 3/2017 | Simsek ................ G06F 9/546 |

(Continued)

FOREIGN PATENT DOCUMENTS

| EP | 0576178 | 12/1993 |
| EP | 2775397 A2 | 9/2014 |

(Continued)

OTHER PUBLICATIONS

International Search Report and The Written Opinion of The International Searching Authority mailed Jul. 1, 2022, for related PCT/US2022/025626, filed Apr. 20, 2022, 17 pages.

(Continued)

*Primary Examiner* — Duy Khuong T Nguyen
(74) *Attorney, Agent, or Firm* — Squire Patton Boggs LLP; Sarah Mirza

(57) ABSTRACT

A computing system or application that enables generation and use of code block elements. A code block element refers to a graphic element that is rendered on a canvas to include content in the form of program code. In examples, the text content of the code block element can include syntax and other formatting that is in accordance with a selected programming language.

16 Claims, 11 Drawing Sheets

(56) References Cited

U.S. PATENT DOCUMENTS

| | | |
|---|---|---|
| 10,129,188 B2 | 11/2018 | Liu |
| 10,606,576 B1 | 3/2020 | Tung |
| 11,010,542 B2 | 5/2021 | Nelson |
| 11,074,107 B1* | 7/2021 | Nandakumar ............ G06F 8/10 |
| 2004/0054627 A1 | 3/2004 | Rutledge |
| 2007/0118794 A1 | 5/2007 | Hollander |
| 2010/0037149 A1 | 2/2010 | Heath |
| 2010/0192107 A1 | 7/2010 | Takahashi |
| 2011/0047532 A1 | 2/2011 | Wang |
| 2011/0268262 A1 | 11/2011 | Jones |
| 2013/0013089 A1 | 1/2013 | Kawakami |
| 2013/0014023 A1 | 1/2013 | Lee |
| 2013/0031208 A1 | 1/2013 | Linton |
| 2013/0081004 A1* | 3/2013 | Vargas ..................... G06F 8/51 717/137 |
| 2013/0097476 A1 | 4/2013 | Koroda |
| 2013/0111338 A1 | 5/2013 | Huo |
| 2013/0124967 A1 | 5/2013 | Hatfield |
| 2014/0108963 A1 | 4/2014 | Black |
| 2014/0258968 A1 | 9/2014 | Brown |
| 2014/0298153 A1 | 10/2014 | Tsujimoto |
| 2014/0310660 A1 | 10/2014 | Rosen |
| 2014/0344418 A1 | 11/2014 | Jones |
| 2015/0032366 A1 | 1/2015 | Man |
| 2015/0127753 A1 | 5/2015 | Tew |
| 2015/0302338 A1 | 10/2015 | Zaveri |
| 2016/0012350 A1* | 1/2016 | Narayanan ............ G06F 9/4484 706/12 |
| 2016/0110063 A1 | 4/2016 | Connolly |
| 2016/0232785 A1 | 8/2016 | Wang |
| 2016/0343156 A1 | 11/2016 | Yoshizawa |
| 2016/0358467 A1 | 12/2016 | Jeong |
| 2017/0052767 A1* | 2/2017 | Bennett ..................... G06F 8/34 |
| 2017/0109139 A1 | 4/2017 | Bitner |
| 2017/0192656 A1 | 7/2017 | Pedrick |
| 2017/0293544 A1 | 10/2017 | Katayama |
| 2017/0339370 A1 | 11/2017 | Inoue |
| 2018/0121039 A1 | 5/2018 | Bliss |
| 2018/0173701 A1 | 6/2018 | Kim |
| 2018/0174446 A1 | 6/2018 | Wang |
| 2018/0189033 A1* | 7/2018 | Narang ..................... G06F 8/38 |
| 2018/0285084 A1 | 10/2018 | Mimlitch, III |
| 2018/0315248 A1 | 11/2018 | Bastov |
| 2018/0337880 A1 | 11/2018 | Sokolov |
| 2018/0350144 A1 | 12/2018 | Rathod |
| 2019/0129927 A1 | 5/2019 | Okamoto |
| 2019/0179501 A1 | 6/2019 | Seeley |
| 2019/0236975 A1* | 8/2019 | Chong ..................... G06F 8/34 |
| 2019/0238602 A1 | 8/2019 | Lo |
| 2019/0294422 A1 | 9/2019 | Martel |
| 2019/0303880 A1 | 10/2019 | Hashimoto |
| 2019/0361580 A1 | 11/2019 | Dowling |
| 2020/0201831 A1 | 6/2020 | Shekhawat |
| 2020/0296147 A1 | 9/2020 | Eliason |
| 2021/0124561 A1 | 4/2021 | Pezaris |
| 2021/0208775 A1 | 7/2021 | Allington |
| 2022/0108276 A1 | 4/2022 | Stringham |
| 2022/0129118 A1 | 4/2022 | Hsu |
| 2022/0191594 A1 | 6/2022 | Devoy, III |
| 2022/0263675 A1 | 8/2022 | Cupala |
| 2022/0334704 A1 | 10/2022 | Lin |
| 2022/0334806 A1 | 10/2022 | Lin |

FOREIGN PATENT DOCUMENTS

| | | |
|---|---|---|
| EP | 3293619 | 3/2018 |
| EP | 3633472 A1 | 4/2020 |
| WO | WO-2009/132444 A1 | 11/2009 |
| WO | WO-2019/209391 A1 | 10/2019 |
| WO | WO-2021/097141 | 5/2021 |
| WO | WO-2021/159079 | 8/2021 |
| WO | WO-2022/061027 | 3/2022 |
| WO | WO-2022/109200 | 5/2022 |

OTHER PUBLICATIONS

Wallace Evan: "Multiplayer Editing in Figma", figma.com/blog, Sep. 28, 2016 (Sep. 28, 2016), XP055930547, Retrieved from the Internet: URL: https://www.figma.com/blog/multiplayer-editing-in-figma/ [retrieved on Jun. 13, 2022] the whole document, 7 pages.

Anonymous: "Change cursor into custom text", Dec. 24, 2018 (Dec. 24, 2018), XP055930588, Retrieved from the Internet: URL: https://stackoverflow.com/questions/53916492/change-cursor-into-custome-text [retrieved on Jun. 13, 2022] the whole document, 2 pages.

International Search Report and The Written Opinion of The International Searching Authority mailed Jul. 25, 2022, for related PCT/US2022/025840 filed Apr. 20, 2022, 17 pages.

Paper by WeTransfer—Simple Sketch App, "Creativity at your fingertips" URL:https://web.archive.org/web/20220121205009/https://wetransfer.com/paper, 9 pages, Jan. 21, 2022.

Zack Qattan, "Collaborative Cursor Chat w/Croquet", Nov. 30, 2020, youtube.com, https://www.youtube.com/watch?v=NiqTCROdlgw pp. 1-15 (Year: 2020).

International Search Report and The Written Opinion of The International Searching Authority mailed Feb. 1, 2023, for related PCT/US2022/047191 filed Oct. 19, 2022, 16 pages.

International Search Report and The Written Opinion of The International Searching Authority mailed Mar. 1, 2023 for related PCT/US2022/050134 filed Nov. 16, 2022, 10 pages.

Philippe Charles et al.: "Accelerating the creation of customized, language-specific IDEs in Eclipse", ACM Sigplan Notices, Association for Computing Machinery, US, vol. 44, No. 10, Oct. 25, 2009 (Oct. 25, 2009), pp. 191-206, XP058304685; ISSN: 0362-1340, DOI: 10.1145/1639949.1640104; p. 192, right-hand column, line 25-35, p. 196, right-hand column, line 6-13, abstract.

"AutoCAD Custom User Interface—Custom Ribbons, Creating Commands and Toolbars", AIMCAD on YouTube, Mar. 19, 2018.

Office Action received for European Application No. 22809258.1 dated Aug. 26, 2025, 5 pages.

\* cited by examiner

CODE BLOCK ELEMENT FOR INTEGRATED GRAPHIC DESIGN SYSTEM

RELATED APPLICATIONS

This application claims benefit of priority to provisional U.S. Patent Application No. 63/257,476, filed Oct. 19, 2021; the aforementioned priority application being hereby incorporated by reference in its respective entirety.

TECHNICAL FIELD

Examples described herein relate to integrated graphic design systems, and specifically, to integrated graphic design systems that enable creation and use of code block elements.

BACKGROUND

Software design tools have many forms and applications. In the realm of application user interfaces, for example, software design tools require designers to blend functional aspects of a program with aesthetics and even legal requirements, resulting in a collection of pages which form the user interface of an application. For a given application, designers often have many objectives and requirements that are difficult to track.

DETAILED DESCRIPTION

Figure 1A:
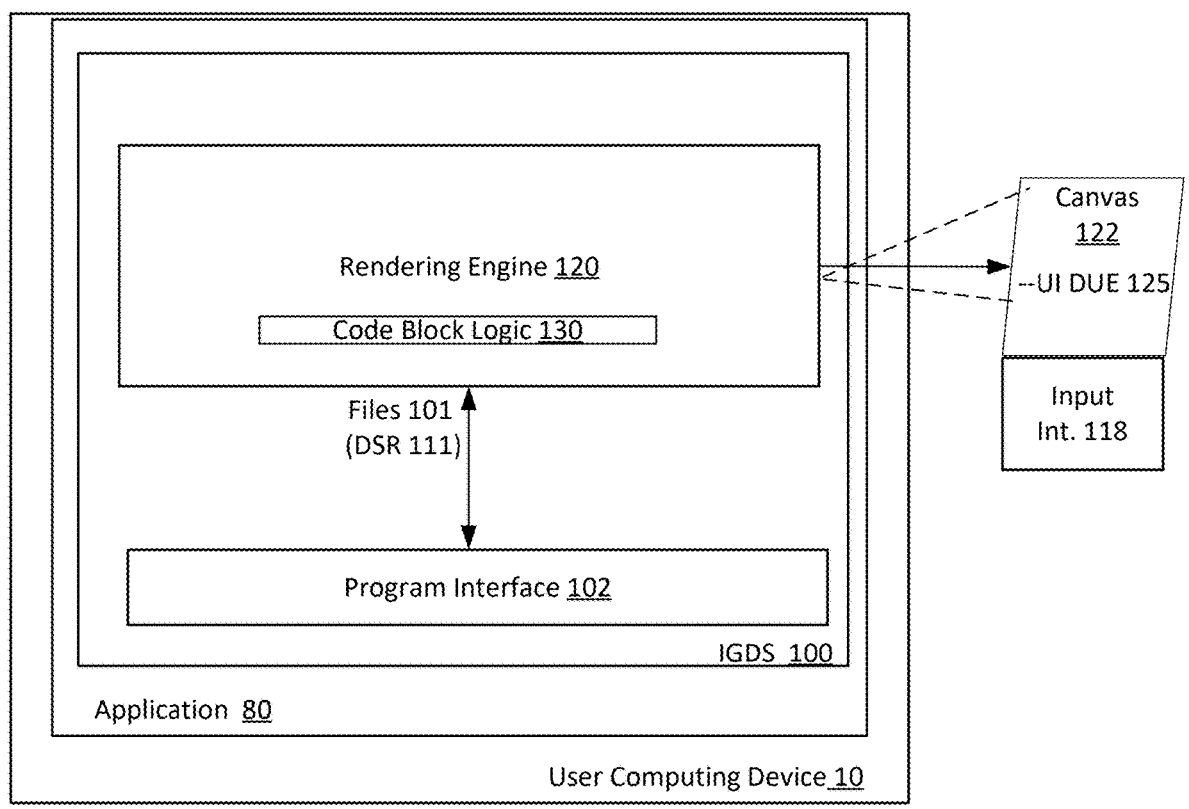
FIG. 1A illustrates an interactive graphic design system for a computing device of a user, according to one or more embodiments.

Examples include an integrated design system or application that enables generation and use of code block elements. A code block element refers to a graphic element that is rendered on a canvas to include content in the form of program code. In examples, the text content of the code block element can include syntax and other formatting that is in accordance with a selected programming language.

In some variations, the code block elements are active, meaning the program code is executable to perform some function. For example, the content of the program code can execute to alter the canvas, such as by creating another graphic element or altering other graphic elements that appear on the canvas. In other variations, the content of the program code can execute to alter the code block element itself.

Still further, in some examples, the code block element can be used to call a plugin component. For example, a code block element can be rendered as a design element. Once triggered, the contents of the code block element can be scanned to identify a plugin. The plugin can then be called and executed. Alternatively, the user can be prompted for input in connection with execution of the plugin.

Among other advantages, examples as described enable such users to quickly and efficiently utilize code block elements to facilitate developers in sharing work product (e.g., routines, plug-ins) during collaborative sessions. In other applications, users can demonstrate or teach code to one another writing through use of code blocks that are rendered in a collaborative computing environment. By way of illustration, examples as described can be implemented in a remote classroom setting, to facilitate a teacher with samples and demonstrations of coding.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, tablets, wearable electronic devices, laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1A illustrates an interactive graphic design system for a computing device of a user, according to one or more examples. An interactive graphic design system ("IGDS") 100 can be implemented in any one of multiple different computing environments. For example, in some variations, the IGDS 100 can be implemented as a client-side application that executes on the user computing device 10 to provide functionality as described with various examples. In other examples, such as described below, the IGDS 100 can be implemented through use of a web-based application 80. As an addition or alternative, the IGDS 100 can be implemented as a distributed system, such that processes described with various examples execute on a network computer (e.g., server) and on the user device 10.

According to examples, the IGDS 100 can be implemented on a user computing device 10 to enable a corresponding user to design various types of interfaces using graphical elements. The IGDS 100 can include processes that execute as or through a web-based application 80 that is installed on the computing device 10. As described by various examples, web-based application 80 can execute scripts, code and/or other logic (the "programmatic components") to implement functionality of the IGDS 100. Additionally, in some variations, the IGDS 100 can be implemented as part of a network service, where web-based application 80 communicates with one or more remote computers (e.g., server used for a network service) to executes processes of the IGDS 100.

In some examples, web-based application 80 retrieves some or all of the programmatic resources for implementing the IGDS 100 from a network site. As an addition or alternative, web-based application 80 can retrieve some or all of the programmatic resources from a local source (e.g., local memory residing with the computing device 10). The web-based application 80 may also access various types of data sets in providing the IGDS 100. The data sets can correspond to files and libraries, which can be stored remotely (e.g., on a server, in association with an account) or locally.

In examples, the web-based application 80 can correspond to a commercially available browser, such as GOOGLE CHROME (developed by GOOGLE, INC.), SAFARI (developed by APPLE, INC.), and INTERNET EXPLORER (developed by the MICROSOFT CORPORATION). In such examples, the processes of the IGDS 100 can be implemented as scripts and/or other embedded code which web-based application 80 downloads from a network site. For example, the web-based application 80 can execute code that is embedded within a webpage to implement processes of the IGDS 100. The web-based application 80 can also execute the scripts to retrieve other scripts and programmatic resources (e.g., libraries) from the network site and/or other local or remote locations. By way of example, the web-based application 80 may execute JAVASCRIPT embedded in an HTML resource (e.g., webpage structured in accordance with HTML 5.0 or other versions, as provided under standards published by W3C or WHATWG consortiums). In some examples, the rendering engine 120 and/or other components may utilize graphics processing unit (GPU) accelerated logic, such as provided through WebGL (Web Graphics Library) programs which execute Graphics Library Shader Language (GLSL) programs that execute on GPUs.

According to examples, user of computing device 10 operates web-based application 80 to access a network site, where programmatic resources are retrieved and executed to implement the IGDS 100. In this way, the user may initiate a session to implement the IGDS 100 for purpose of creating and/or editing a design interface. In examples, the IGDS 100 includes a program interface 102, an input interface 118, and a rendering engine 120. The program interface 102 can include one or more processes which execute to access and retrieve programmatic resources from local and/or remote sources.

In an implementation, the program interface 102 can generate, for example, a canvas 122, using programmatic resources which are associated with web-based application 80 (e.g., HTML 5.0 canvas). As an addition or variation, the program interface 102 can trigger or otherwise cause the canvas 122 to be generated using programmatic resources and data sets (e.g., canvas parameters) which are retrieved from local (e.g., memory) or remote sources (e.g., from network service).

The program interface 102 may also retrieve programmatic resources that include an application framework for use with canvas 122. The application framework can include data sets which define or configure, for example, a set of interactive graphic tools that integrate with the canvas 122 and which comprise the input interface 118, to enable the user to provide input for creating and/or editing a design interface.

According to some examples, the input interface 118 can be implemented as a functional layer that is integrated with the canvas 122 to detect and interpret user input. The input interface 118 can, for example, use a reference of the canvas 122 to identify a screen location of a user input (e.g., 'click'). Additionally, the input interface 118 can interpret an input action of the user based on the location of the detected input (e.g., whether the position of the input indicates selection of a tool, an object rendered on the canvas, or region of the canvas), the frequency of the detected input in a given time period (e.g., double-click), and/or the start and end position of an input or series of inputs (e.g., start and end position of a click and drag), as well as various other input types which the user can specify (e.g., right-click, screen-tap, etc.) through one or more input devices. In this manner, the input interface 118 can interpret, for example, a series of inputs as a design tool selection (e.g., shape selection based on location of input), as well as inputs to define attributes (e.g., dimensions) of a selected shape.

Additionally, the program interface 102 can be used to retrieve, from local or remote sources, programmatic resources and data sets which include files 101 which comprise an active workspace for the user. The retrieved data sets can include one or more pages that include design elements which collectively form a design interface, or a design interface that is in progress. Each file 101 can include one or multiple data structure representations 111 which collectively define the design interface. The files 101 may also include additional data sets which are associated with the active workspace. For example, as described with some examples, the individual pages of the active workspace may be associated with a set of constraints. As an additional example, the program interface 102 can retrieve (e.g., from network service 152 (see FIG. 1B), from local memory, etc.) one or more types of profile information, such as user profile information which can identify past activities of the user of the computing device 10 when utilizing the IGDS 100. The profile information can identify, for example, input types (or actions) of the user with respect to the page(s) of the active workspace, or more generally, input actions of the user in a prior time interval. In some variations, the profile information can also identify historical or contextual information about individual design interfaces, as represented by corresponding data structure representations 111.

In examples, the rendering engine 120 uses the data structure representations 111 to render a corresponding graphic content (e.g., design under edit, or "DUE 125") on the canvas 122, wherein the DUE 125 reflects graphic elements and their respective attributes as provided with the individual pages of the files 101. The user can edit the DUE 125 using the input interface 118. Alternatively, the rendering engine 120 can generate a blank page for the canvas 122, and the user can use the input interface 118 to generate the DUE 125. As rendered, the DUE 125 can include graphic elements such as a background and/or a set of objects (e.g., shapes, text, images, programmatic elements), as well as attributes of the individual graphic elements. Each attribute of a graphic element (including code block element) can include an attribute type and an attribute value. For an object, the types of attributes include, shape, dimension (or size), layer, type, color, line thickness, text size, text color, font, and/or other visual characteristics. Depending on implementation, the attributes reflect properties of two- or three-dimensional designs. In this way, attribute values of individual objects can define, for example, visual characteristics of size, color, positioning, layering, and content, for elements that are rendered as part of the DUE 125.

In examples, individual design elements may also be defined in accordance with a desired run-time behavior. By way of example, some objects can be defined to have run-time behaviors that are either static or dynamic. The attributes of dynamic objects may change in response to predefined run-time events generated by the underlying application that is to incorporate the DUE 125. Additionally, some objects may be associated with logic that defines the object as being a trigger for rendering or changing other objects, such as through implementation of a sequence or workflow. Still further, other objects may be associated with logic that provides the design elements to be conditional as to when they are rendered and/or their respective configuration or appearance when rendered. Still further, objects may also be defined to be interactive, where one or more attributes of the object may change based on user-input during the run-time of the application.

Network Computing System to Implement IGDS

Figure 1B:
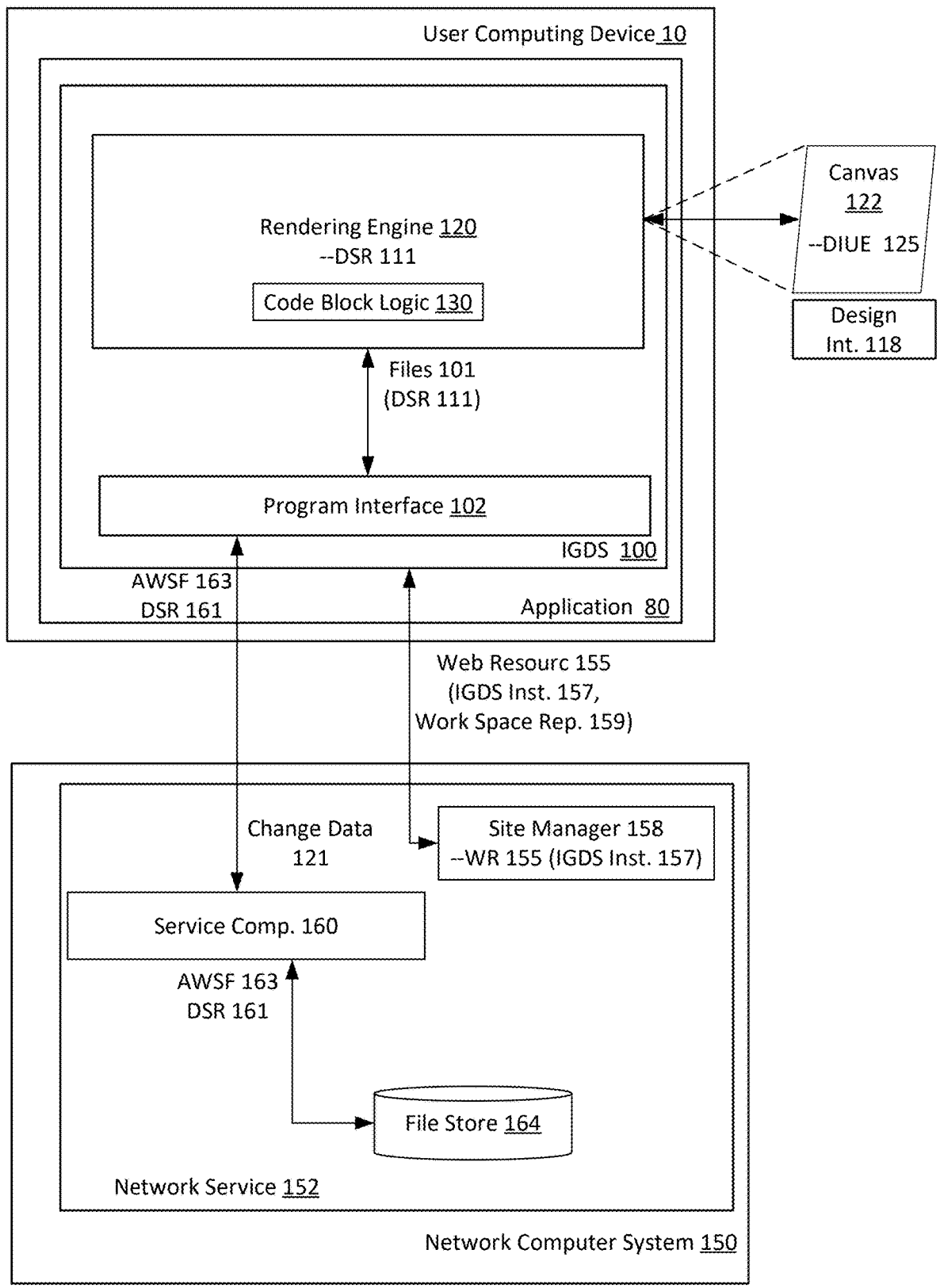
FIG. 1B illustrates a network computing system to implement an interactive graphic design system on a user computing device, according to one or more embodiments.

FIG. 1B illustrates a network computing system to implement an interactive graphic design system on a user computing device, according to one or more examples. A network computing system such as described with an example of FIG. 1B can be implemented using one or more servers which communicate with user computing devices over one or more networks.

In an example of FIG. 1B, the network computing system 150 perform operations to enable the IGDS 100 to be implemented on the user computing device 10. In variations, the network computing system 150 provides a network service 152 to support the use of the IGDS 100 by user computing devices that utilize browsers or other web-based applications. The network computing system 150 can include a site manager 158 to manage a website where a set of web-resources 155 (e.g., web page) are made available for site visitors. The web-resources 155 can include instructions, such as scripts or other logic ("IGDS instructions 157"), which are executable by browsers or web components of user computing devices.

In some variations, once the computing device 10 accesses and downloads the web-resources 155, web-based application 80 executes the IGDS instructions 157 to implement functionality such as described with some examples of FIG. 1A. For example, the IGDS instructions 157 can be executed by web-based application 80 to initiate the program interface 102 on the user computing device 10. The initiation of the program interface 102 may coincide with the establishment of, for example, a web-socket connection between the program interface 102 and a service component 160 of the network computing system 150.

In some examples, the web-resources 155 includes logic which web-based application 80 executes to initiate one or more processes of the program interface 102, causing the IGDS 100 to retrieve additional programmatic resources and data sets for implementing functionality as described by examples. The web resources 155 can, for example, embed logic (e.g., JAVASCRIPT code), including GPU accelerated logic, in an HTLM page for download by computing devices of users. The program interface 102 can be triggered to retrieve additional programmatic resources and data sets from, for example, the network service 152, and/or from local resources of the computing device 10, in order to implement the IGDS 100. For example, some of the components of the IGDS 100 can be implemented through web-pages that can be downloaded onto the computing device 10 after authentication is performed, and/or once the user performs additional actions (e.g., download one or more pages of the workspace associated with the account identifier). Accordingly, in examples as described, the network computing system 150 can communicate the IGDS instructions 157 to the computing device 10 through a combination of network communications, including through downloading activity of web-based application 80, where the IGDS instructions 157 are received and executed by web-based application 80.

The computing device 10 can use web-based application 80 to access a website of the network service 152 to download the webpage or web resource. Upon accessing the website, web-based application 80 can automatically (e.g., through saved credentials) or through manual input, communicate an account identifier to the service component 160. In some examples, web-based application 80 can also communicate one or more additional identifiers that correlate to a user identifier.

Additionally, in some examples, the service component 160 can use the user or account identifier of the user identifier to retrieve profile information from a user profile store. As an addition or variation, profile information for the user can be determined and stored locally on the user's computing device 10.

The service component 160 can also retrieve the files of an active workspace ("active workspace files 163") that are linked to the user account or identifier from a file store 164. The profile store 166 can also identify the workspace that is identified with the account and/or user, and the file store 164 can store the data sets that comprise the workspace. The data sets stored with the file store 164 can include, for example, the pages of a workspace, data sets that identify constraints for an active set of workspace files, and one or more data structure representations 161 for the design under edit which is renderable from the respective active workspace files.

Additionally, in examples, the service component 160 provides a representation 159 of the workspace associated with the user to the web-based application 80, where the representation identifies, for examples, individual files associated with the user and/or user account. The workspace representation 159 can also identify a set of files, where each file includes one or multiple pages, and each page including objects that are part of a design interface.

On the user device 10, the user can view the workspace representation through web-based application 80, and the user can elect to open a file of the workspace through web-based application 80. In examples, upon the user electing to open one of the active workspace files 163, web-based application 80 initiates the canvas 122. For example, the IGDS 100 can initiate an HTML 5.0 canvas as a component of web-based application 80, and the rendering engine 120 can access one or more data structures representations 111 of a design interface under edit, to render the corresponding DUE 125 on the canvas 122.

Collaborative Network Platform

Figure 1C:
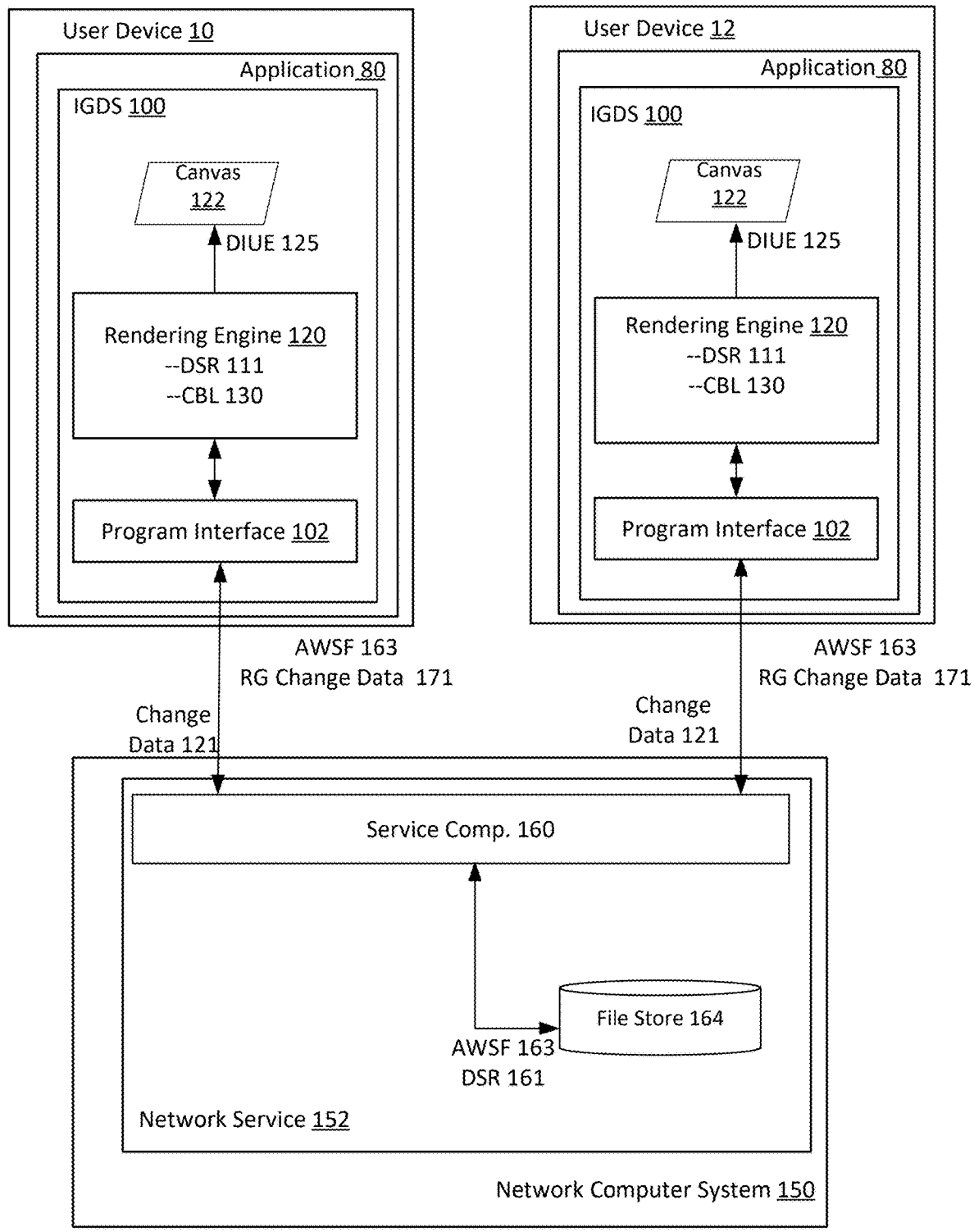
FIG. 1C illustrates a network computing system to implement an interactive graphic design system for multiple users in a collaborative network platform, according to one or more embodiments.

FIG. 1C illustrates a network computing system to implement an interactive graphic design system for multiple users in a collaborative network platform, according to one or more examples. In an example of FIG. 1C, a collaborative network platform is implemented by the network computing system 150, which communicates with multiple user computing devices 10, 12 over one or more networks (e.g., World Wide Web) to implement the IGDS 100 on each computing device. While FIG. 1C illustrates an example in which two users utilize the collaborative network platform, examples as described allow for the network computing system 150 to enable collaboration on design interfaces amongst a larger group of users.

With respect to FIG. 1C, the user computing devices 10, 12 can be assumed as being operated by users that are associated with a common account, with each user computing device 10, 12 implementing a corresponding IGDS 100 to access the same workspace during respective sessions that overlap with one another. Accordingly, each of the user computing devices 10, 12 may access the same set of active workspace files 163 at the same time, with the respective program interface 102 of the IGDS 100 on each user computing device 10, 12 operating to establish a corresponding communication channel (e.g., web socket connection) with the service component 160.

In examples, the service component 160 can communicate a copy of the active workspace files 163 to each user computing device 10, 12, such that the computing devices 10, 12 render the DUE 125 of the active workspace files 163 at the same time. Additionally, each of the computing devices 10, 12 can maintain a local data structure representation 111 of the respective DUE 125, as determined from the active workspace files 163. The service component 160 can also maintain a network-side data structure representation 161 obtained from the files of the active workspace 163, and coinciding with the local data structure representations 111 on each of the computing devices 10, 12.

The network computing system 150 can continuously synchronize the active workspace files 163 on each of the user computing devices. In particular, changes made by users to the DUE 125 on one computing device 10, 12 may be immediately reflected on the DUE 125 rendered on the other user computing device 10, 12. By way of example, the user of computing devices 10 can make a change to the respective DUE 125, and the respective rendering engine 120 can implement an update that is reflected in the local copy of the data structure representation 111. From the computing device 10, the program interface 102 of the IGDS 100 can stream change data 121, reflecting the change of the user input, to the service component 160. The service component 160 processes the change data 121 of the user computing device. The service component 160 can use the change data 121 to make a corresponding change to the network-side data structure representation 161. The service component 160 can also stream remotely-generated change data 171 (which in the example provided, corresponds or reflects change data 121 received from the user device 10) to the computing device 12, to cause the corresponding IGDS 100 to update the DUE 125 as rendered on that device. The computing device 12 may also use the remotely generated change data 171 to update with the local data structure representation 111 of that computing device 12. The program interface 102 of the computing device 12 can receive the update from the network computing system 150, and the rendering engine 120 can update the DUE 125 and the respective local copy of 111 of the computing device 12.

The reverse process can also be implemented to update the data structure representations 161 of the network computing system 150 using change data 121 communicated from the second computing device 12 (e.g., corresponding to the user of the second computing device updating the DUE 125 as rendered on the second computing device 12). In turn, the network computing system 150 can stream remotely generated change data 171 (which in the example provided, corresponds or reflects change data 121 received from the user device 12) to update the local data structure representation 111 of the DUE 125 on the first computing device 10. In this way, the DUE 125 of the first computing device 10 can be updated as a response to the user of the second computing device 12 providing user input to change the DUE 125.

To facilitate the synchronization of the data structure representations 111, 111 on the computing devices 10, 12, the network computing system 150 may implement a stream connector to merge the data streams which are exchanged between the first computing device 10 and the network computing system 150, and between the second computing device 12 and the network computing system 150. In some implementations, the stream connector can be implemented to enable each computing device 10, 12 to make changes to the network-side data representation 161, without added data replication that may otherwise be required to process the streams from each device separately.

Additionally, over time, one or both of the computing devices 10, 12 may become out-of-sync with the server-side data representation 161. In such cases, the respective computing device 10, 12 can redownload the active workspace files 163, to restart its maintenance of the data structure representation of the DUE 125 that is rendered and edited on that device.

Code Block Logic

With reference to examples of FIG. 1A through FIG. 1C, the rendering engine 120 can include code block logic 130 to enable a user to render graphic content that includes interactive code block elements to be rendered as part of a graphic design or presentation. In examples, the system 100 can render interactive code block elements as part of a service that provides a whiteboarding application, presentation application, and/or integrated design application. In some variations, the service can be collaborative, meaning multiple users can participate at one time in creating graphic content on a shared canvas.

As described in examples, a code block element is a type of graphic element (e.g., container) that renders code block content within a frame or container. The system 100 can receive code block content from user-input or from a file (e.g., via an import operation). The rendering engine 120 renders the code block element on the canvas 122 to exhibit behavior similar to other graphic elements. In examples, the rendering engine 120 applies functionality and rules to allow code block elements to connect with other design elements (e.g., with line connectors), be subject to constraints, have auto-layout functionality (e.g., code block elements may be stretched), and/or be associated with other types of functionality. Still further, code block elements can behave as container objects, such that they can be sized, resized, repositioned, parented to other container objects, and connected or linked with other container objects and graphic elements.

As described in greater detail, the rendering engine 120 executes the code block logic 130 to render textual content within the container of the code block in predetermined coding formats or styles (e.g., preselected text color, background fill, font, spacing, etc.). The code block logic 130 can be associated with each code block element that is rendered on the canvas 122. The text content can be received through keyboard entry or other types of input from the user. Alternatively, the text content can be received from importing content from a file or copying and pasting textual content from another source. The rendering engine 120 generate graphic elements on canvas 122, which are subject to design rules and functionality which enable interaction between objects.

Figure 2A:
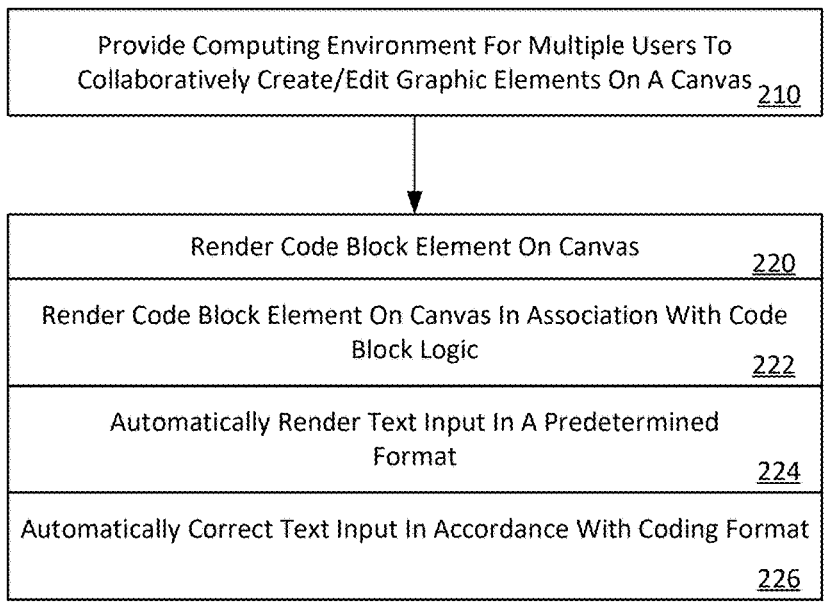
FIG. 2A through FIG. 2C illustrates example methods for providing code block elements in an interactive graphic design system
Figure 2B:
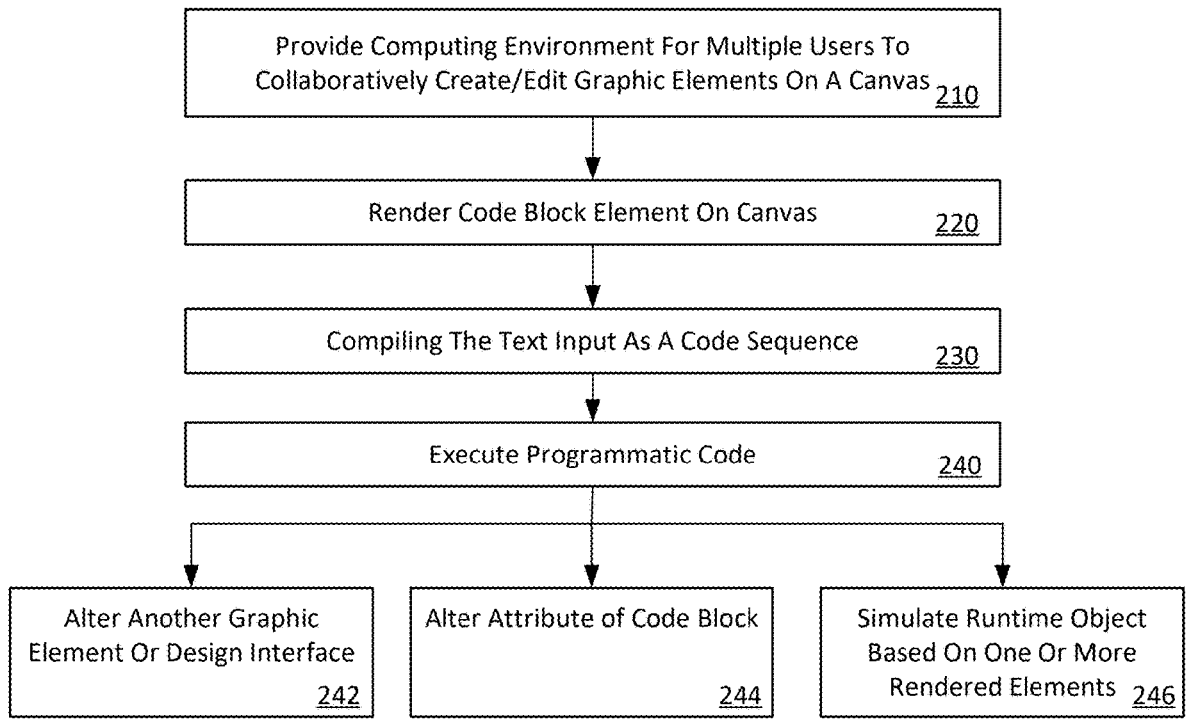

Further, as described with some examples, the code block logic 130 can include, or be associated with components that compile and/or execute code, determined from the content of the respective code block (e.g., see FIG. 2B). Further, the code block logic 130 can sequence execution of code distributed amongst multiple code block elements of a design based on, for example, line connectors that interconnect the code block elements. Still further, in some variations, the code block logic 130 can execute to identify and call plugins (e.g., see FIG. 2C).

With reference to an example of FIG. 1C, code block elements can be generated in a collaborative environment for purpose of demonstration amongst peers, or for purpose of teaching (e.g., teacher to student). For example, the code block logic 130 can execute program code contained in code block elements, where execution of the code of the code block elements causes changes to be made to the canvas (e.g., See FIG. 4A and FIG. 4B, and FIG. 4C and FIG. 4D). For example, the execution of code contained in the code block elements can cause a desired visual effect with respect to other design elements, or with respect to the code block itself. In the collaborative medium, the code blocks can be used as a demonstration or testing tool, as the impact of program coding can be visually rendered on the canvas where the code block is contained.

Methodology

Figure 2C:
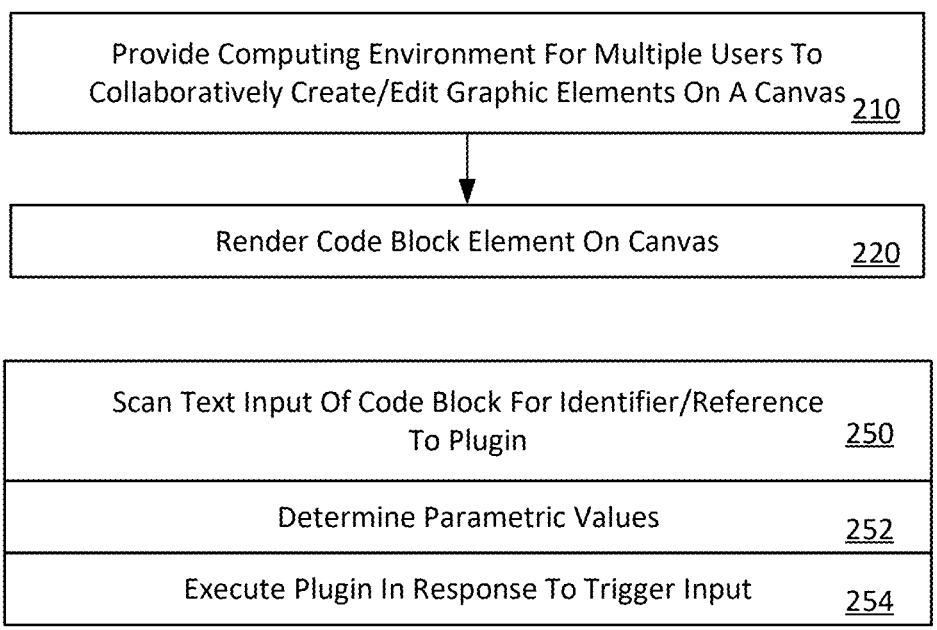

FIG. 2A through FIG. 2C illustrates example methods for providing code block elements in an interactive graphic design system. In particular, FIG. 2A illustrates an example method for providing formatted code block elements on a canvas, in combination with other elements, according to one or more examples. FIG. 2B illustrates an example method for providing executable code block elements that are renderable as design elements of a canvas, according to one or more examples. FIG. 2C illustrates an example method for providing code block elements that are executable to call plugins or other programs, according to one or more examples. Example methods such as described with FIG. 2A through FIG. 2C can be implemented using components and functionality such as described with examples of FIG. 1. Accordingly, reference may be made to elements of FIG. 1 for purpose of illustration.

With reference to FIG. 2A, step 210 provides that the IGDS 100 implements a computing environment in which one or more users can create and edit graphic elements on a canvas. The graphic elements can include code block elements, as well as other design elements, such as may be defined by containers and other attributes. The IGDS 100 can include, for example, items on a tool bar that correspond to a code block element, as well as other input tools for creating other types of design elements. In this way, the IGDS 100 enables users to select and configure design elements of various types, including code block elements. In some examples, multiple users can operate corresponding user computing devices to collaborate on a graphic design at one time, such as during a collaborative session. Sill further, the IGDS 100 can implement or otherwise provide multiple application services, such as a whiteboarding application, presentation application, and/or integrated graphic design application. The graphic design can be rendered on multiple different application services, based on, for example, a selection of the user.

In step 220, responsive to user input, the IGDS 100 renders graphic content that includes one or more code block elements. The graphic content can include design elements that are characteristic by properties that include, for example, size, shape, position (on canvas), line thickness and attributes, fill color or appearance, text color or appearance, layer, etc. In examples, some graphic elements can include a container that defines a size, shape and line attributes. Still further, other types of design elements can include connectors which connect two or more design elements. By way of illustration, line connectors can operate to anchor to design elements at each end, such that when one or both of the connected design elements is moved or resized, the shape, length and/or contours/bends of the respective line connectors change to maintain the line connection with the connected design elements. As another illustration, design elements can include text content, including text blocks.

In examples, the rendering engine 120 renders design elements on a canvas in accordance with a set of rendering logic. The rendering logic can include rules that define, for example, how the set of properties of individual design elements are to be altered or modified automatically in response to modifications to properties of other design elements. By way of illustration, the rendering engine 120 can implement logic to maintain nested relationships amongst design elements. A nested relationship amongst design elements is a type of logical relationship that can be implemented when a container of one design element (e.g., "parent" element) encloses the container of another design element (e.g., "child" element). When a nested relationship exists, input to reposition or resize one of the design elements of the nested relationships can cause repositioning and/or resizing by the other design element. Depending on implementation, if the child design element is resized or moved, the rendering logic may provide for the parent object to be resized or repositioned as needed to maintain its enclosure of the child element. Similarly, if the parent design element is resized or moved, the rending logic may provide for the child object to be resized or repositioned as well, so that the child design element remains nested within the parent element.

As described with other examples, a code block element can correspond to a type of graphic element which a user can create on a shared canvas. For example, the user can interact with a design tool element to create a code block on the shared canvas. The code block graphic element can be created to have a container that receives text input, as well as an associated set of logic. Further, the code block can be associated with a particular set of attributes. For example, the container of the code block element can include a set of properties that define a shape, size, position (e.g., centerline or point), and line attribute (e.g., thickness, type, color) of the container. Depending on implementation, once the code block is rendered, the code block element can receive alphanumeric input from one or multiple users. The user input can also cause the code block element to interact as a container-element with other graphic elements on the canvas 122, in accordance with one or more predetermined rules implemented by the rendering engine 120.

In some examples, the code block element is initially rendered as a container having a shape, size and other attributes which are designated by default or optionally selected by the user. Once rendered, the code block element can receive alphanumeric input from the user that created it, as well as other users of the collaborative session.

In step 222, each code block element is rendered in association with a set of code block logic. In some examples, when a code block element is rendered, the user can select a particular formatting language, or provide other input from which the associated logic is selected or configured. Subsequently, when text input is received, the code block can implement the associated logic to automatically format the text in accordance with a particular coding format, where, for example, the coding format designates spacing (e.g., between lines or characters), special characters or terms (e.g., line numbering, character designating comment field, etc.) text coloring and/or syntax. The selected coding format can be based on a given programming language (e.g., corresponding to the user request).

Accordingly, in step 224, when text input is received, the rendering engine 120 implements the code block logic to automatically format the text input. The code block logic can implement formatting rules that are specific to a workspace, platform or other convention. In examples, the code block logic can specify font, typeset, color, and spacing. For example, certain types of alphanumeric characters (e.g., numbers) can be colored differently than other text (e.g., numeric input in red or purple, text input in white). Additionally, the rendering engine can auto insert characters such as line numbers or special characters. Still further, the associated code block logic can execute to automatically implement or enforce syntax rules for a corresponding coding format (e.g., in accordance with syntax of a corresponding programming language).

Step 226 illustrates that in some examples, the rendering engine 120 implements the code block logic to automatically detect or correct aspects of the code block content (e.g., alphanumeric input provided by the user). For example, the coding format can include syntax rules for the corresponding programming language. The code block logic can, for example, implement auto-correction/formatting by replacing characters (e.g., single quotation mark with double quotation mark or vice versa), as well implementing spelling and grammar check on the alphanumeric content of the code block element.

By way of examples, logic to autoformat and/or autocorrect code block content can support multiple different programming languages and conventions. A user can specify a default programming language or convention for use with an account or design. For example, a menu of options listing different programming languages and/or coding formats may be provided with a rendered code block to enable the user to specify the coding format for the code block. In some options, the user may specify the programming language before entering text, such that subsequent text can be automatically formatted in accordance with the corresponding coding format. As an addition or variation, the user can change the selection of the programming language after an initial selection, such that subsequent text is autoformatted in accordance with the newly selected programming language. In such examples, text previously entered by the user (e.g., in accordance with a different format) can be reformatted with the new selection of the user. In other variations, the user can enter text without selecting a programming language, where the coding format is detected by default. Alternatively, text entry can be neutral when entered and formatted for a particular coding format after the user selects the programming language.

Still further, as an addition or alternative, the system 100 autodetects the particular format by analyzing the code block content and selecting a rule set that most closely matches the syntax and/or format of the code block content.

Further, in some examples, the IGDS 100 can save code block content by default, so that when a code block element is open on the canvas 122, the saved content is automatically rendered by default. For example, a user can close a code block element containing code block content in order to have the content reappear when the code block element is used again. Alternatively, the user can save a code block element for later use. Still further, the user can import or paste copied content into a code block element. In such examples, the code block logic can be implemented to automatically format or re-format the pasted content.

With reference to FIG. 2B, steps 210 and 220 can be performed as described with examples of FIG. 2A. In step 230, the IGDS 100 uses the associated code block logic to compile text content of the code block element as programmatic code. In examples, the IGDS 100 can include an execution component that can include one or more compilers for different programming languages that may be used. The compiling of the alphanumeric input can detect syntax and logical errors. In some implementations, when errors are detected, the rendering engine 120 can flag the portion of the content where the error is deemed to have occurred.

In some examples, step 240 provides that the IGDS 100 executes the compiled code of the code block element. In some examples, the rendering engine 120 can include or call an execution component to execute compiled code of a selected code block element. For example, the rendering engine 120 can associate the code block element with a script that executes in response to the trigger, in order to call an execution component for the contents of the code block. Further, the execution component can be configured for the selected programming language or format of the code block.

Execution of code block content can be responsive to a predefined trigger, such as a particular user input (e.g., user enters RETURN on keyboard).

According to examples, the execution executes the compiled code to (i) alter the design of the canvas by modifying or introducing new graphic elements (step 242), (ii) alter the design of the code block element itself (step 244), and/or (iii) simulate a runtime object that is based on one or more graphic elements rendered on the canvas 122 (step 246).

In some examples, the rendering engine 120 structures code block content to include a combination of (i) static or non-editable portions, and (ii) editable portions (e.g., fields). Based on user permissions or settings associated with the design, a given user may be able to interact with the code block content to alter only certain portions of the code block content. For example, in a learning application, the code block content can include non-editable code that forms a portion of a routine (e.g., plugin). The rendered code block can enable a given user to provide input that is editable. By way of illustration, the user can provide (i) additive input to enable the user to complete the program routine, or (ii) corrective input at select portions to enable the user to correct a portion of the routine. Still further, as described with other examples, the code block content can include programming code for a plugin, and the user can provide editable input (e.g., input that specifies parametric values) to enable the plugin to execute.

Still further, in some examples, multiple code blocks can be structured on a canvas 122 to reflect a sequence or logical relationship between the code blocks. For example, line connectors can be used to interconnect code blocks that are rendered on a given canvas 122. In such examples, the line connectors can represent a sequence or logical relationship (e.g., called routine, nested loop) in the execution of corresponding code block content between two code blocks that are connected by line connectors. Further, in variations, the represented sequence or logical relationship can be automatically taken into account when code block content is executed or exported.

With reference to FIG. 2C, steps 210 and 220 can be performed as described with examples of FIG. 2A. In some variations, step 230 can also be performed to compile the code for implementing the plugin. In step 250, the IGDS 100 scans the content of the code block element to identify a reference to a plugin. For example, the rendering engine 120 can execute or call an execution component that corresponds to a plugin interface. The IGDS 100 can further maintain a library of plugins (e.g., as part of the network service and/or downloaded on individual user machines. Further, in some variations, the IGDS 100 can process information about plugins to determine a search index, from which terms of the code block content can be matched. The scanning can be performed in response to an input trigger, such as a designated input from the user (e.g., user presses ENTER). The reference to the plugin can be, for example, a plugin identifier (e.g., plugin name). For example, the IGDS 100 can include an execution module that maps terms of the code block to a list or dictionary of plugin names. Alternatively, the user can provide designated input to identify a term as a plugin. Still further, the code block logic can be implemented to compare markers and terms used in the text with plugin identifiers.

In addition to identifying a plugin identifier, the IGDS 100 can, in step 252, scan the code block content for parametric input of the plugin. For example, a search index of plugins can identify plugin parameters (and values), in association with plugin identifiers. As an addition or variation, the IGDS 100 can execute code, based on the content of the code block, to call an identified plugin. In step 254, the identified plugin in can execute. For example, the rendering engine 120 or other execution component can execute the plugin to alter the graphic design (e.g., another code block element), or the code block element itself. Still further, the plugin can be executed to create a design element or generate an interface from which the user can further manipulate the design elements or perform other actions. Still further, the plugin can execute to generate prompts from which the user can provide input, after which the plugin executes further to prompt for other input or perform other functionality.

Still further, in some examples, the rendering engine 120 can determine the plug-in identifier and one or more corresponding plugin parametric values in real-time, such as responsive to the user input. In such examples, once the plug-in identifier is determined, the rendering engine 120 can retrieve a set of prompts associated with the plug-in. While the user is interacting with the code block element, the rendering engine 120 can detect a trigger input (e.g., user presses ENTER on keyboard). The rendering engine 120 can then retrieve and execute the identified plug-in, using parametric values specified within the code block element. In some examples, the code for the plug-in can also be displayed at runtime within the code block.

With reference to examples described with FIG. 2A through FIG. 2C, in some examples, the IGDS 100 can automatically export code from one or more rendered code blocks into a code library or file. For example, upon formatting, compiling or executing the code entered by the user into a code block element, the IGDS 100 can automatically (or programmatically, responsive to user input) implement an export operation to save the code in a code library.

EXAMPLES

FIG. 3 and FIG. 4A through FIG. 4D illustrate examples of code block elements as rendered on a canvas, according to one or more embodiments. In describing examples of FIG. 3 and FIG. 4A to FIG. 4D, reference is made to elements of FIG. 1 for purpose of illustrating components for implementing functionality as described.

Figure 3:
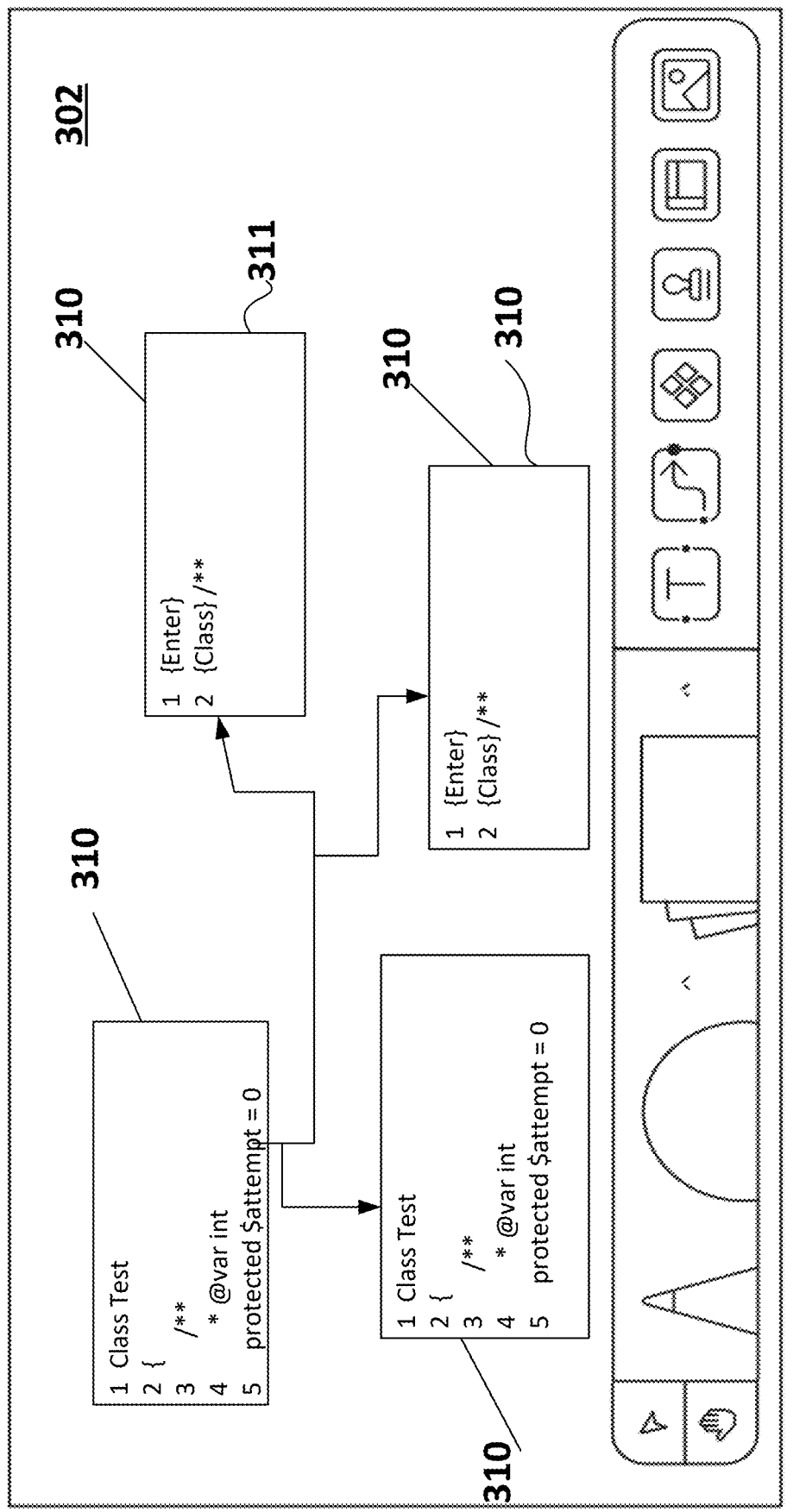
FIG. 3 illustrates an example of a code block element on a canvas, according to one or more embodiments.

FIG. 3 illustrates an example of IGDS 100 generating code block elements 310 on a canvas 302. Each code block element 310 can receive text input that is automatically formatted by font, color or other attribute. The code block elements 310 can also be linked by one or more connectors. As described with other examples, the connectors can also represent a sequence or logical relationship between code block content of the different code block elements 310.

In examples, each code block element 310 can be provided a container 311 that is rendered as a design element, in accordance with rendering logic used by the rendering engine 120. Each code block 310 can include a set of attributes that define properties of the container. For example, each code block 310 can include attributes of shape, size, position (e.g., centerline), line thickness and other properties. As containers 311, each code block element 310 can interact with other design elements (e.g., other code block elements or shapes on the canvas 302), in accordance with rendering rules. For example, individual code blocks 310 can be interconnected with other design elements using line connected 312. In some variations, code block elements can be nested within other design elements, subject to autoformatting rules (e.g., automatically resized based on a nested relationship with another design element that is resized), and/or subject to other rules where attributes of the code block element (e.g., size, position, line thickness, etc.) or changed based on operations to other design elements. The type or manner of interaction can be implemented by the rendering engine based on a predetermined set of rendering rules/logic.

Additionally, as described with other examples, the code block elements 310 can also be associated with a set of code block logic that executes to format the text content in accordance with a selected programming logic or format. Further, in some examples, the code block logic can enable the text content to execute to implement functionality, and/or call plugins which execute functionality.

Figure 4A:
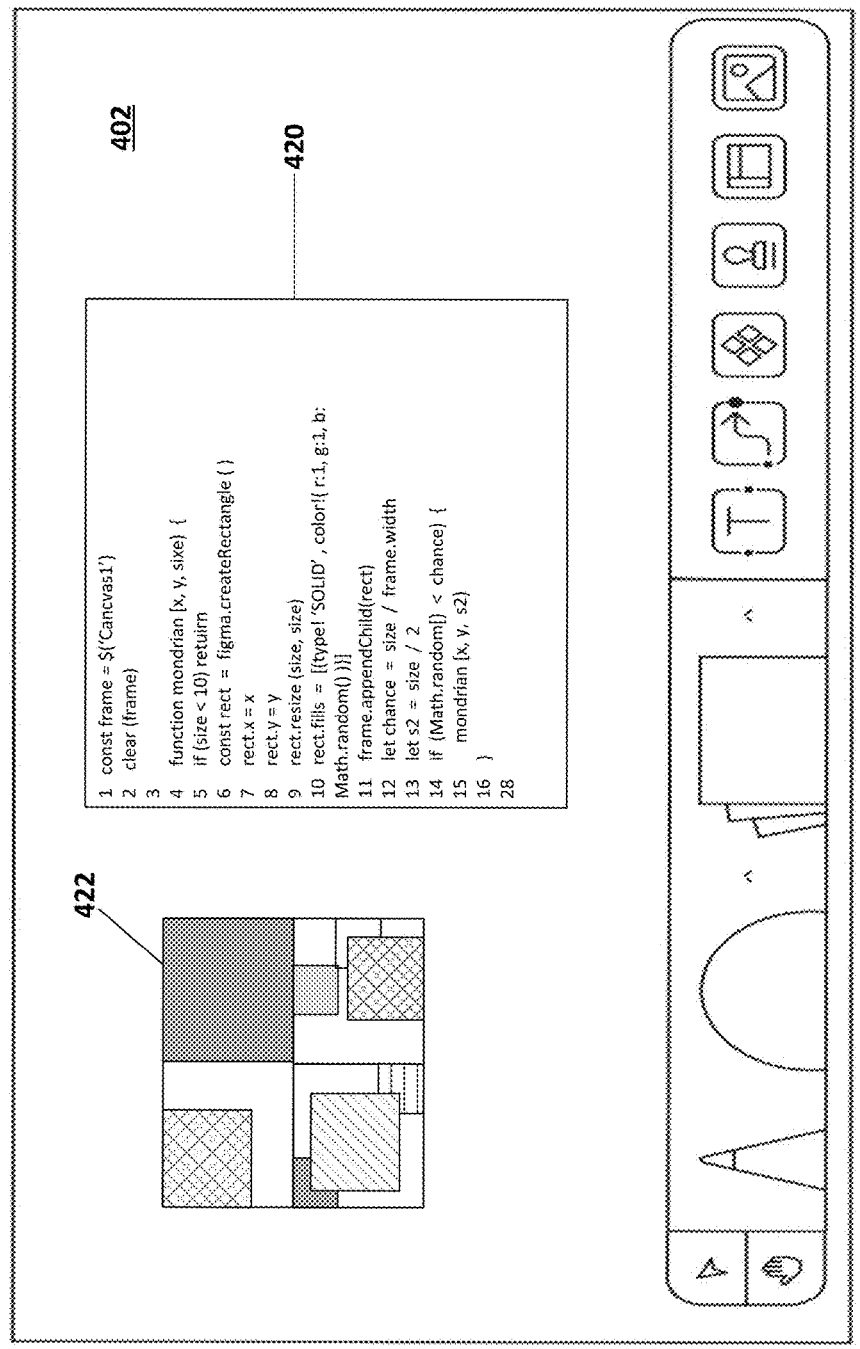
FIG. 4A through FIG. 4D illustrate examples of active code block elements, according to one or more embodiments.
Figure 4B:
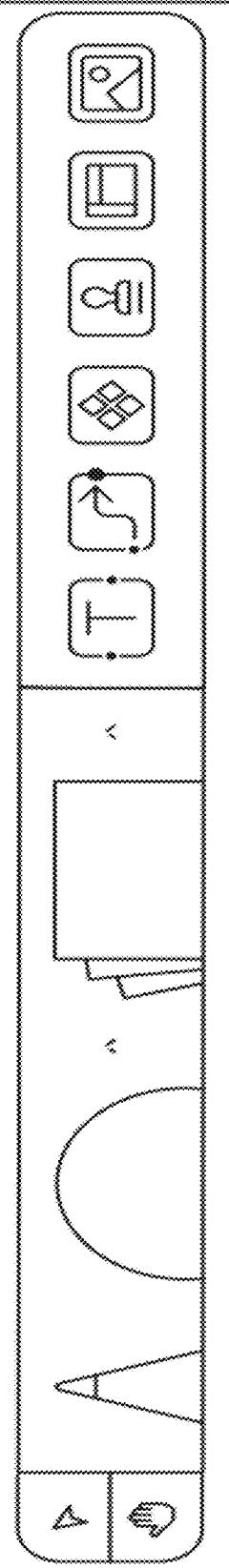
Figure 4B:
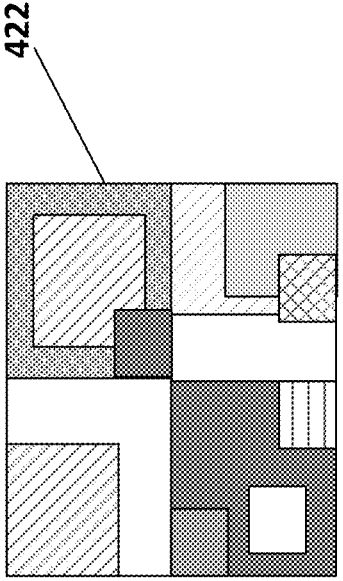

FIG. 4A and FIG. 4B illustrate an example in which an active code block element 420 is executed to affect the contents of a canvas 402. In examples, an active code block element is executable. As shown, the active code block element 420 is executed (e.g., such as by the user providing a trigger input), causing the rendering engine 120 to generate or modify another graphic design element 422.

In FIG. 4B, the code executed by the code block element 430 is shown to vary one or more attributes (e.g., fill color) of the newly generated element, based on the logic of the executed code in the code block 420. For example, the executed code block can generate a random fill for the code block 420. Once executed, the graphic design element 422 can continuously change (e.g., by fill, color, etc.).

Figure 4C:
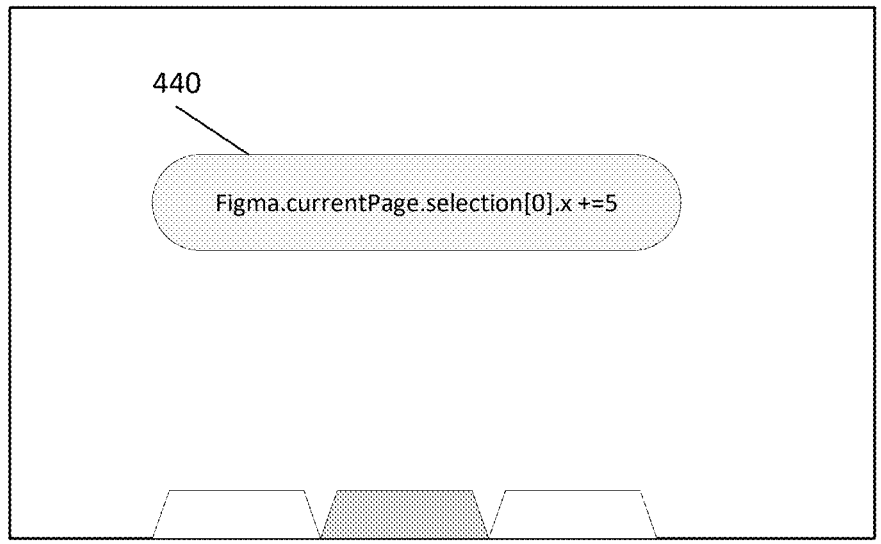
Figure 4D:
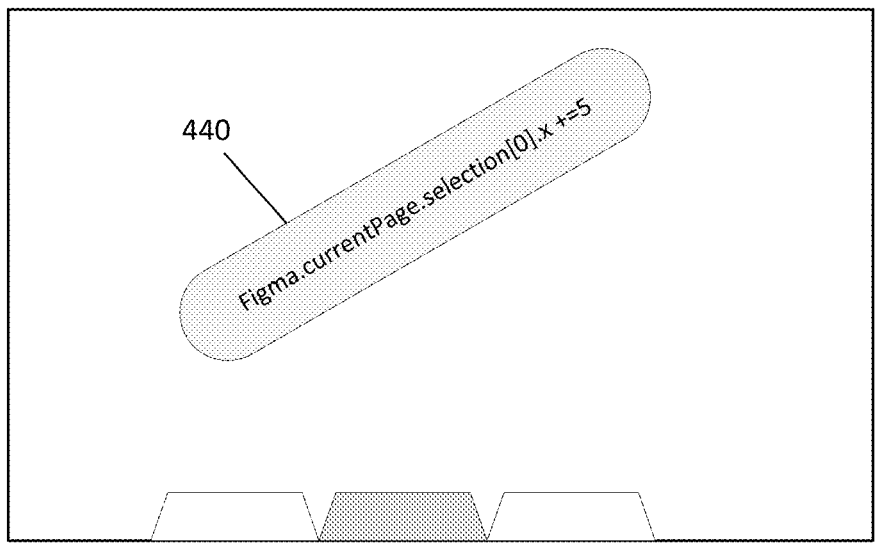

FIG. 4C and FIG. 4D illustrate another example in which an active code block element 440 is executed on a canvas 402. As shown, the active code block element 440 can execute to alter the attribute of the code block itself. For example, as shown, the code block element 440 can execute to cause the rendering engine 120 to alter an attribute of the code block (e.g., orientation or position on the canvas).

Among other advantages, examples as described with FIG. 4A-4B and FIG. 4C-4D can be implemented in a collaborative session to enable demonstration of code. For example, in a teaching environment, an instruction can provide code, or have students work collaboratively to generate code, where the code can be executed to cause a desired affect to a design of the canvas (or elements contained thereof). This allows the code, as well as the affect of the code's execution to be viewed on a shared canvas.

Network Computer System

Figure 5:
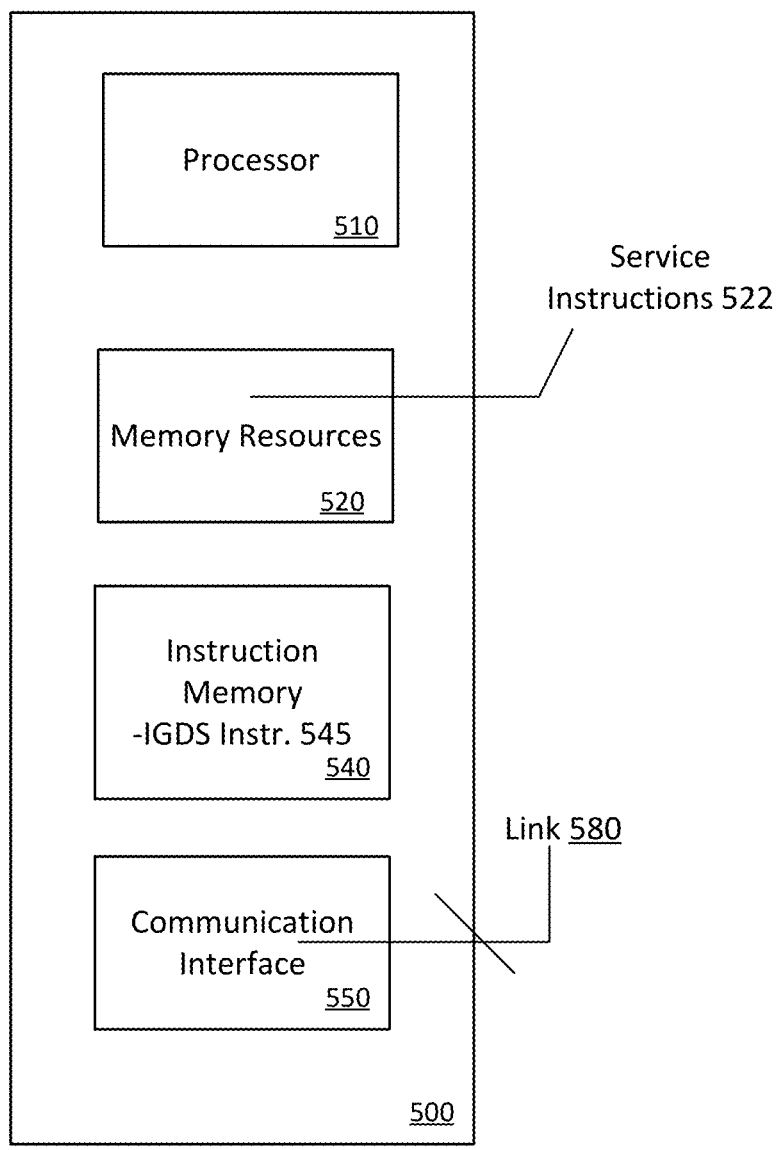
FIG. 5 illustrates a computer system on which one or more embodiments can be implemented.

FIG. 5 illustrates a computer system on which one or more embodiments can be implemented. A computer system 500 can be implemented on, for example, a server or combination of servers. For example, the computer system 500 may be implemented as the network computing system 150 of FIG. 1A through FIG. 1C, and further utilized by a plugin management system 200 of FIG. 2.

In one implementation, the computer system 500 includes processing resources 510, memory resources 520 (e.g., read-only memory (ROM) or random-access memory (RAM)), one or more instruction memory resources 540, and a communication interface 550. The computer system 500 includes at least one processor 510 for processing information stored with the memory resources 520, such as provided by a random-access memory (RAM) or other dynamic storage device, for storing information and instructions which are executable by the processor 510. The memory resources 520 may also be used to store temporary variables or other intermediate information during execution of instructions to be executed by the processor 510.

The communication interface 550 enables the computer system 500 to communicate with one or more user computing devices, over one or more networks (e.g., cellular network) through use of the network link 580 (wireless or a wire). Using the network link 580, the computer system 500 can communicate with one or more computing devices, specialized devices and modules, and/or one or more servers.

In examples, the processor 510 may execute service instructions 522, stored with the memory resources 520, in order to enable the network computing system to implement the network service 152 and operate as the network computing system 150 in examples such as described with FIG. 1A through FIG. 1C.

The computer system 500 may also include additional memory resources ("instruction memory 540") for storing executable instruction sets ("IGDS instructions 545") which are embedded with web-pages and other web resources, to enable user computing devices to implement functionality such as described with the IGDS 100.

As such, examples described herein are related to the use of the computer system 500 for implementing the techniques described herein. According to an aspect, techniques are performed by the computer system 500 in response to the processor 510 executing one or more sequences of one or more instructions contained in the memory 520. Such instructions may be read into the memory 520 from another machine-readable medium. Execution of the sequences of instructions contained in the memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

User Computing Device

Figure 6:
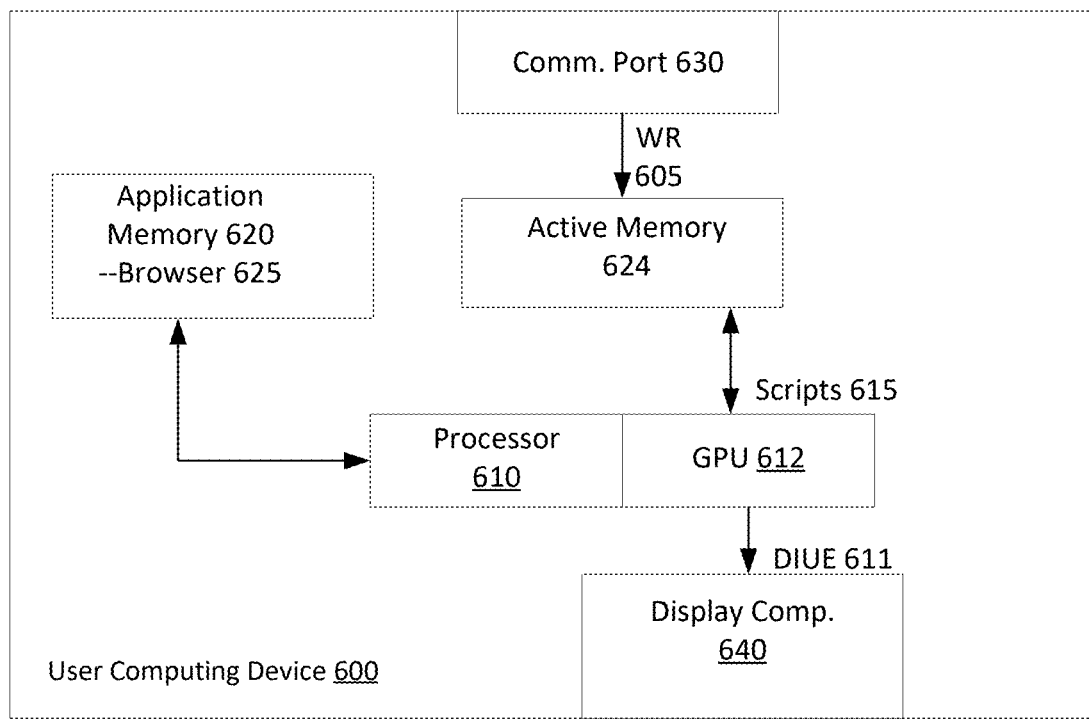
FIG. 6 illustrates a user computing device for use with one or more examples, as described.

FIG. 6 illustrates a user computing device for use with one or more examples, as described. In examples, a user computing device 600 can correspond to, for example, a workstation, a desktop computer, a laptop or other computer system having graphics processing capabilities that are suitable for enabling renderings of design interfaces and graphic design work. In variations, the user computing device 600 can correspond to a mobile computing device, such as a smartphone, tablet computer, laptop computer, VR or AR headset device, and the like.

In examples, the computing device 600 includes a central or main processor 610, a graphics processing unit 612, memory resources 620, and one or more communication ports 630. The computing device 600 can use the main processor 610 and the memory resources 620 to store and launch a browser 625 or other web-based application. A user can operate the browser 625 to access a network site of the network service 152, using the communication port 630, where one or more web pages or other resources 605 for the network service 152 (see FIG. 1A through FIG. 1C and FIG. 2) can be downloaded. The web resources 605 can be stored in the active memory 624 (cache).

As described by various examples, the processor 610 can detect and execute scripts and other logic which are embedded in the web resource in order to implement the IGDS 100 (see FIG. 1A through FIG. 1C). In some of the examples, some of the scripts 615 which are embedded with the web resources 605 can include GPU accelerated logic that is executed directly by the GPU 612. The main processor 610 and the GPU can combine to render a design interface under edit ("DIUE 611") on a display component 640. The rendered design interface can include web content from the browser 625, as well as design interface content and functional elements generated by scripts and other logic embedded with the web resource 605. By including scripts 615 that are directly executable on the GPU 612, the logic embedded with the web resource 605 can better execute the IGDS 100, as described with various examples.

CONCLUSION

Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network computer system comprising:
one or more processors;
a memory to store a set of instructions;
wherein the one or more processors access the instructions from the memory to perform operations that include:
providing a graphic design environment, the graphic design environment including a canvas on which one or more users create and/or edit graphic elements of multiple types;
wherein the multiple types of graphic elements include a code block element type, the code block element type being associated with multiple types of formatting logic, each of the multiple types of formatting logic being selectable in accordance with a menu of options listing different programming languages, the menu of options being provided with the code block element type to implement a corresponding format that is based on a set of syntax rules for a corresponding programming language of the different programming languages;
responsive to user input, rendering a code block element on the canvas, the code block element being rendered to receive text input;
responsive to receiving text input with the code block element, automatically implementing a first selected formatting logic of the multiple types to render the text input in a first corresponding format for a first programming language of the different programming languages;
responsive to selection of a second programming language from the menu of options listing different programming languages, automatically reformatting the text input into a second corresponding format in accordance with the second programming language; and
scanning the text input to determine one or more programmatic actions to be executed on the canvas; and
executing the one or more programmatic actions, wherein, upon execution, at least one of the programmatic actions modifies one or more visual characteristics of the code block element and at least one other graphic element on the canvas.

2. The network computer system of claim 1, wherein the operations include automatically error correcting the text input in accordance with one or more syntax rules for the corresponding programming language of the selected formatting logic.

3. The network computer system of claim 2, wherein the operations includes compiling the text input as a code sequence of the corresponding programming language for the selected formatting logic.

4. The network computer system of claim 1, wherein scanning the text input includes:
identifying a call operation and a plugin identifier from the scanned text; and
wherein the one or more programmatic actions include performing the call operation using the plugin identifier.

5. The network computer system of claim 4, wherein scanning the text input includes identifying one or more input parameters in the scanned text; and
wherein the one or more programmatic actions include performing the call operation using the plugin identifier and the one or more determined input parameters.

6. The network computer system of claim 1, wherein more programmatic actions include altering one or more properties of the code block.

7. The network computer system of claim 1, wherein the operations further comprise:
updating a nodal representation of a design created on the canvas using logic specified in the scanned text.

8. The network system of claim 1, wherein the code block element includes a container including a first set of properties, and wherein the operations include:
altering one or more properties of the first set based on user input.

9. The network system of claim 1, wherein the operations include:
rendering multiple code block elements on the canvas, the multiple code block elements being connected by a first connector; and wherein the operations further comprise enabling the each of the code block elements to be manipulated while connected by the first connector.

10. A non-transitory computer-readable medium that stores instructions, which when executed by one or more processors of a computer system, cause the computer system to perform operations comprising:
providing a graphic design environment, the graphic design environment including a canvas on which one or more users create and/or edit graphic elements of multiple types;
wherein the multiple types of graphic elements include a code block element type, the code block element type being associated with multiple types of formatting logic, each of the multiple types of formatting logic being selectable in accordance with a menu of options listing different programming languages, the menu of options being provided with the code block element type to implement a corresponding format that is based on a set of syntax rules for a corresponding programming language of the different programming languages;
responsive to user input, rendering a code block element on the canvas, the code block element being rendered to receive text input;
responsive to receiving text input with the code block element, automatically implementing a first selected formatting logic of the multiple types to render the text input in the corresponding format for a first programming language of the different programming languages;
responsive to selection of a second programming language from the menu of options listing different programming languages, automatically reformatting the text input into a second corresponding format in accordance with the second programming language; and
scanning the text input to determine one or more programmatic actions to be executed; and
executing the one or more programmatic actions, wherein, upon execution, at least one of the programmatic actions modifies one or more visual characteristics of the code block element and at least one other graphic element on the canvas.

11. The non-transitory computer-readable medium of claim 9, wherein scanning the text input includes:

identifying a call operation and a plugin identifier from the scanned text; and wherein the one or more programmatic actions include performing the call operation using the plugin identifier.

12. The non-transitory computer-readable medium of claim 11, wherein scanning the text input includes identifying one or more input parameters in the scanned text; and wherein the one or more programmatic actions include performing the call operation using the plugin identifier and the one or more determined input parameters.

13. The non-transitory computer-readable medium of claim 10, wherein more programmatic actions include altering one or more properties of the code block.

14. The non-transitory computer-readable medium of claim 10, wherein the operations further comprise:

updating a nodal representation of a design created on the canvas using logic specified in the scanned text.

15. The non-transitory computer-readable medium of claim 10, wherein the code block element includes a container including a first set of properties, and wherein the operations include:

altering one or more properties of the set based on user input.

16. A computer-implemented method comprising:

providing a graphic design environment, the graphic design environment including a canvas on which one or more users create and/or edit graphic elements of multiple types;

wherein the multiple types of graphic elements include a code block element type, the code block element type being associated with multiple types of formatting logic, each of the multiple types of formatting logic being selectable in accordance with a menu of options listing different programming languages, the menu of options being provided with the code block element type to implement a corresponding format that is based on a set of syntax rules for a corresponding programming language of the different programming languages;

responsive to user input, rendering a code block element on the canvas, the code block element being rendered to receive text input;

responsive to receiving text input with the code block element, automatically implementing a first selected formatting logic of the multiple types to render the text input in the corresponding format for a first programming language of the different programming languages;

responsive to selection of a second programming language from the menu of options listing different programming languages, automatically reformatting the text input into a second corresponding format in accordance with the second programming language; and scanning the text input to determine one or more programmatic actions to be executed; and executing the one or more programmatic actions, wherein, upon execution, at least one of the programmatic actions modifies one or more visual characteristics of the code block element and at least one other graphic element on the canvas.

* * * * *